US008327100B2

(12) United States Patent
Batifoulier et al.

(10) Patent No.: US 8,327,100 B2
(45) Date of Patent: *Dec. 4, 2012

(54) EXECUTE ONLY ACCESS RIGHTS ON A VON NEUMAN ARCHITECTURES

(75) Inventors: Sandrine Batifoulier, Pourrieres (FR); Stephane Godzinski, Peynier (FR); Vincent Dupaquis, Biver (FR)

(73) Assignee: Inside Secure, Aix-en-Provence, Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/028,756

(22) Filed: Feb. 16, 2011

(65) Prior Publication Data

US 2011/0138141 A1 Jun. 9, 2011

Related U.S. Application Data (63) Continuation of application No. 12/031,586, filed on Feb. 14, 2008, now Pat. No. 7,895,404.

(51) Int. Cl.
*G06F 12/14* (2006.01)
(52) U.S. Cl. ............... 711/163; 711/164; 711/145
(58) Field of Classification Search .................. None
See application file for complete search history.

(56) References Cited

U.S. PATENT DOCUMENTS

| 5,559,989 | A | 9/1996 | Sourgen et al. |
| 5,596,739 | A | 1/1997 | Kane et al. |
| 5,668,973 | A | 9/1997 | Stutz et al. |
| 5,890,189 | A | 3/1999 | Nozue et al. |
| 5,907,864 | A | 5/1999 | Potts et al. |
| 6,032,230 | A | 2/2000 | Fuller et al. |
| 6,160,734 | A | 12/2000 | Henderson et al. |
| 6,202,154 | B1 | 3/2001 | Suzuki et al. |
| 6,643,751 | B2 | 11/2003 | Rosenquist et al. |
| 7,337,360 | B2 * | 2/2008 | Shen et al. ............ 714/20 |
| 7,895,404 | B2 * | 2/2011 | Batifoulier et al. ...... 711/163 |
| 2005/0024954 | A1 * | 2/2005 | Dalvi et al. ............ 365/199 |
| 2005/0108488 | A1 | 5/2005 | Rohm et al. |
| 2005/0210179 | A1 | 9/2005 | Walmsley et al. |
| 2006/0218425 | A1 | 9/2006 | Ding et al. |
| 2007/0005918 | A1 | 1/2007 | Rothman et al. |
| 2007/0124409 | A1 | 5/2007 | Sibert |
| 2009/0055612 | A1 | 2/2009 | Sibert |
| 2009/0113155 | A1 * | 4/2009 | Beals ................. 711/164 |

FOREIGN PATENT DOCUMENTS

| EP | 0661642 | 7/1995 |
| EP | 0859319 | 8/1998 |
| EP | 0608060 | 3/2000 |

OTHER PUBLICATIONS

ATMEL Corporation, International Search Report and the Written Opinion of the corresponding PCT Application No. PCT/US2009/033550 dated Jun. 5, 2009, 12 pages.

* cited by examiner

*Primary Examiner* — Than Nguyen
(74) *Attorney, Agent, or Firm* — Panitch Schwarze Belisario & Nadel LLP (57) ABSTRACT

A microcontroller system, such as a system-on-a-chip integrated circuit, including a processor (e.g., a Von Neumann processor), memory, and a memory protection unit (MPU), where the MPU provides execute-only access rights for one or more protected areas of the memory. The MPU can allow instructions fetched from within a protected area to access data in the protected area while preventing instructions fetched from outside the protected area from accessing data in the protected area.

11 Claims, 4 Drawing Sheets

EXECUTE ONLY ACCESS RIGHTS ON A VON NEUMAN ARCHITECTURES

CROSS-REFERENCE TO RELATED APPLICATIONS

This application is a continuation (and claims the benefit of priority under 35 U.S.C. 120) of U.S. application Ser. No. 12/031,586, filed Feb. 14, 2008. The disclosure of the prior application is considered part of (and is incorporated by reference in) the disclosure of this application.

TECHNICAL FIELD

This subject matter is generally related to microcontroller systems.

BACKGROUND

Many modern electronic systems include multi-application microcontrollers that share a memory space between various applications and an operating system. Access restrictions are often assigned to portions of the memory space to prevent corruption or unauthorized copying of instructions or sensitive data (e.g., personal information of a user). Usually, the operating system can assign access rights to different portions of the memory space by segmenting a memory map corresponding to the memory space into several areas with different access right attributes.

Some processors, such as processors with a Von Neumann architecture, feature only read and write access rights. As a result, only a combination of read and write attributes can be programmed to the memory map. Some applications (e.g., smart card applications) need to distinguish between a read access and an execution access. If one of these applications is executed on a processor without an appropriate access right, the application's memory area can be susceptible to code corruption.

SUMMARY

A microcontroller system, such as a system-on-a-chip integrated circuit, includes a processor (e.g., a Von Neumann processor), memory, and a memory protection unit (MPU), where the MPU provides execute-only access rights for one or more protected areas of the memory. The MPU can allow instructions fetched from within a protected area to access data in the protected area while preventing instructions fetched from outside the protected area from accessing data in the protected area.

Particular embodiments of the subject matter described in this specification can be implemented to realize one or more of the following advantages. Providing an execute-only access right allows application code and sensitive data in a protected area of a memory to be protected against code corruption. Multiple protected areas can be programmed or fixed in a memory map corresponding to a memory. Constants generated by compilation of application code can also be protected by locating the generated constants in protected areas.

DESCRIPTION OF DRAWINGS

Like reference symbols in the various drawings indicate like elements.

DETAILED DESCRIPTION

System Overview

Figure 1:
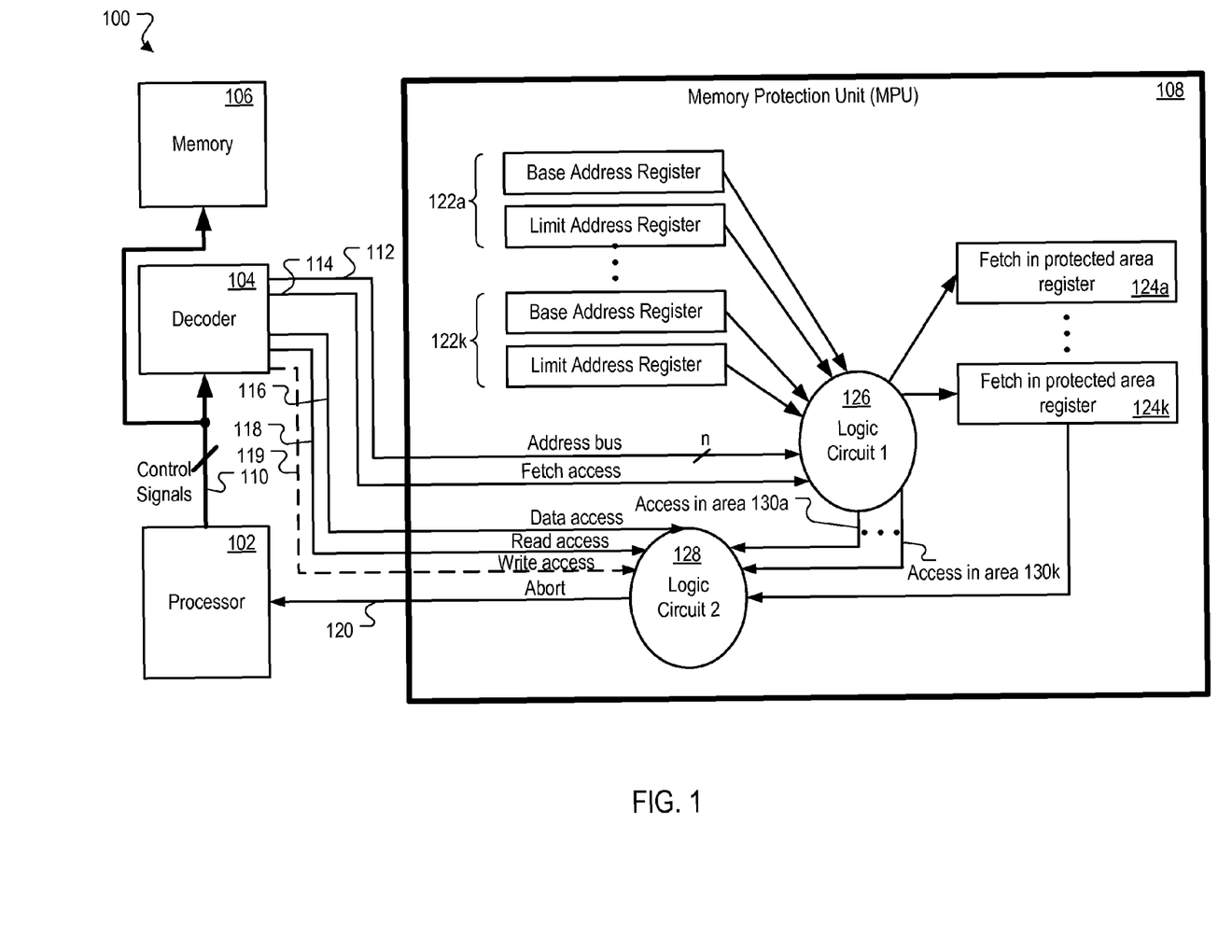
FIG. 1 shows an example secure microcontroller system.

FIG. 1 shows an example secure microcontroller system 100. The microcontroller system 100 can be used in a secure smart card system (e.g., a microcontroller system for controlling a stored value card). The microcontroller system 100 can include a processor 102, a decoder 104, a memory 106, and a memory protection unit (MPU) 108. For example, the processor 102 can be a microprocessor having a Von-Neumann architecture (e.g., an ARM7TDMI microprocessor or a SC100 microprocessor) with a single data bus to access both instructions and data in a single memory space. One or more access rights can be assigned to locations in the memory 106. For example, typical MPUs include a read-only access right to prevent code corruption, e.g., by aborting attempts to write to a read-only protected area of the memory 106. In some implementations, the MPU 108 can assign as execute-only memory areas one or more memory areas of a memory map (not shown) corresponding to the memory 106, as described in further detail below.

In some implementations, the memory 106 (e.g., a memory array) stores program instructions and data for an operating system (OS) and other application programs. The processor 102 can perform functions specified by the program instructions by fetching the instructions from the memory 106. For example, the program instructions can instruct the processor 102 to access the memory 106 to read data from or write data to a specific memory location. Based on the access right assigned to the memory location, the memory access can be allowed or forbidden. For example, the MPU 108 can prevent the processor 102 from reading data from or writing data to a memory address in a protected area based on a memory location of an instruction previously fetched by the processor 102.

The processor 102 can access (e.g., reads, writes, or executes) the stored instructions or data in the memory 106 by sending control signals 110 to the memory 106, e.g., on an address bus and a data bus. In this example, the processor 102 sends the control signals 110 to specify a memory address and a memory operation, such as a program instruction fetch, a read data memory access, or a write data memory access. The specified memory operation can be performed at the specified memory address. In one example, if the processor 102 specifies a memory address A and a memory operation of a read data memory access, the memory 106 can return the data stored at the memory address A to the processor 102.

In some implementations, the OS can assign access rights in various memory areas of the memory 106. For example, the OS can assign a read, a write, and/or an execute- only attributes to portions of the memory 106. Based on the assigned attributes, the microcontroller system 100 can determine whether a memory access from the processor 102 at a specified memory location is allowed. For example, if the OS assigns a read-only access right to a memory area, then the microcontroller system 100 allows read accesses from the processor 102 to any data stored in the read-only memory area and blocks write accesses to the read-only memory area. In some implementations, the OS generates a memory map that describes access rights of various memory areas in the memory 106. Some examples of memory maps are described with reference to FIGS. 2-3.

In certain implementations, the processor 102 (e.g., a Von Neumann processor) provides only one memory map for both program instructions and data. As a result, read data memory accesses and instruction fetch memory accesses are not distinguished in the processor 102. In some implementations, the processor 102 does not feature an execute-only access right for programming the memory 106. Using the decoder 104 and the MPU 108, one or more execute-only memory areas can be programmed or fixed in a memory map corresponding to the memory 106.

As shown in FIG. 1, the decoder 104 receives the control signals 110 transmitted from the processor 102 to the memory 106. The decoder 104 decodes the control signals 110 into an n-bit address bus 112, a fetch access signal 114, a data access signal 116, and a read access signal 118. In some implementations, a write access signal 119 is also decoded from the control signals 110. For example, if the MPU 108 does not include a read-only right attribute to prevent unauthorized write access of the memory 106, the MPU 108 can provide write protection for the memory 106 if the MPU 108 receives a write access signal 119 from the decoder 104, as described in more detail below. The address bus 112 can transmit an n-bit (e.g., 16-bit, 32-bit, 64-bit, 128-bit, etc.) memory address signal.

Depending on the type of the processor 102, the decoder 104 can be implemented differently to decode the control signals 110 specific to the type of processor 102. In one example, if the processor 102 is an ARM7TDMI processor, the fetch signal 114, the data access signal 116, the read access signal 118, and optionally the write access signal 119 are decoded from a Not Op-Code Fetch (nOPC) signal, a Not Memory Request (nMREQ) signal, and a Not Read, Write (nRW) signal of the ARM7TDMI processor. For example, a logic state 0 in the nOPC signal is decoded as a fetch access; a logic state 1 in the nOPC signal and a logic state 0 in the nMREQ signal is decoded as a data access; a logic state 0 in the nRW signal is decoded as a read data access; and a logic state 1 in the nRW signal is decoded as a write data access.

In another example, if the processor 102 is an SC100 processor, the fetch signal 114, the data access signal 116, the read access signal 118, and optionally the write access signal 119 are decoded from a PROT[0] signal, a Transaction (TRANS[1]) signal, and a WRITE signal of the SC100 processor. For example, a logic state 0 in the PROT[0] signal is decoded as a fetch access; a logic state 1 in the PROT[0] signal and a logic state 0 in the TRANS[1] signal is decoded as a data access; a logic state 0 in the WRITE signal is decoded as a read data access; and a logic state 1 in the WRITE signal is decoded as a write data access. In some implementations, the decoder 104 can decode control signals 110 from any of multiple processors (e.g., an ARM7TDMI processor and an SC 100 processor).

The MPU 108 receives the n-bit address bus 112, the fetch access signal 114, the data access signal 116, the read access signal 118, and optionally the write access signal 119 and can generate an abort signal 120 to the processor 102. In some implementations, the abort signal 120 will be sent to an abort input of the processor 102, allowing the current instruction to be aborted. If the processor 102 does not feature an abort input, the abort signal 120 can be sent to an interrupt request input of the processor 102 to interrupt the current instruction.

In some implementations, the MPU 108 can include k pairs of base and limit address registers 122a-122k, k fetch in protected area registers 124a-124k corresponding to the address register pairs 122a-122k, respectively, and two logic circuits 126, 128. Some or all of the components of the MPU 108 can be implemented using one or more field-programmable gate arrays (FPGAs), one or more application-specific integrated circuits (ASICs), or a combination of both. Each of the address register pairs 122a-122k can include a base address register and a limit address register. Each of the base address registers and the limit address registers can include n bits specifying a memory address of a memory map corresponding to the memory 106. In one example, for each of the address register pairs 122a-122k, the address stored in the base address register is a lower address than the address stored in the limit address register. Each pair of corresponding base address register and limit address register can define a memory area.

In some implementations, up to k memory areas can be specified using the k address register pairs 122a-122k. For example, each of the address register pairs 122a-122k can define a protected memory area of a memory map. Based on the received decoded signals 112, 114, 116, 118, 119 and the address register pairs 122a-122k, the MPU 108 can generate the abort signal 120 to control data memory access (e.g., read or write) to the protected memory areas. In some implementations, the protected memory areas are fixed. For example, the address register pairs 122a-122k can be hard coded during a manufacturing stage. In some implementations, the protected memory areas are programmable. For example, a user can program the values stored in some or all of the address register pairs 122a-122k to define some or all of the protected memory areas.

The logic circuits 126, 128 are configurable to provide an execute-only access right to the protected memory areas specified by the address register pairs 122a-122k. In this example, the MPU 108 allows data memory access (e.g., read or write) to a protected area only if the data memory access is preceded by an instruction fetch access of a memory address within the protected area. If the data memory access is preceded by an instruction fetch access of a memory address outside the protected area (e.g., a memory address within a different protected area or in an unprotected area), the MPU 108 prevents the data memory access to the protected area.

In some implementations, the logic circuit 126 is configurable to determine whether a memory access from the processor 102 is accessing any of the protected memory areas. If the processor 102 is accessing a protected memory area (e.g., as determined by comparing the current address on the address bus signal 112 with the address register pairs 122a-122k and optionally a non-zero offset), the logic circuit 126 sets a corresponding one of multiple access in area signals 130a-130k, for example, to a logic state 1. For example, if the processor 102 is accessing a protected memory area defined by address register pair 122a, the logic circuit 126 sets the access in area signal 130a to logic state 1. At each instruction fetch access, the logic circuit 126 updates one or more of the fetch in protected area registers 124a-124k based on whether a current instruction fetch access is fetching an instruction within any of the protected memory areas. If the processor 102 fetches an instruction from within one of the protected memory areas, the logic circuit 126 can set the corresponding one of the fetch in protected area registers 124a-124k, for example, to a logic state 1. For example, if the previous instruction fetch access was within the protected memory area corresponding to the address register pair 122a, and the current instruction fetch access is within the protected memory area corresponding to the address register pair 122k, the fetch in protected area register 124a which was previously set to logic state 1 is cleared to logic state 0, and the fetch in protected area register 124k will be set to logic state 1. If the processor 102 fetches an instruction from outside a particular protected memory area (e.g., outside the protected memory area corresponding to the address register pair 122a), the corresponding fetch in protected area register (e.g. the fetch in protected area register 124a), for example, will be cleared to a logic state 0.

The logic circuit 128 can generate the abort signal 120 based on the data access signal 116, the read access signal 118, optionally the write access signal 119, and the outputs of the logic circuit 126, e.g., the access in area signals 130a-130k and the fetch in protected area registers 124a-124k. In some implementations, the logic circuit 128 generates the abort signal 120 if the processor 102 is attempting a data memory access of a protected memory area based on an instruction fetched from outside the protected memory area. If the access in area signal (e.g., the access in area signal 130a) for a first protected memory area is set while the fetch in protected area register (e.g., the fetch in protected area register 124k) for a second protected memory area is set, a data memory access to the first protected memory area (e.g., the protected memory area corresponding to the address register pair 122a) is aborted. That is, both the access in area signal and the fetch in protected area register corresponding to a particular protected memory area must be set for a data memory access to the protected memory area to be allowed. For the protected memory area corresponding to the address register pair 122a, the logic circuit 128 can generate the abort signal 120 if the data access signal 116 indicates a data memory access, the read access signal 118 indicates that the data memory access is a read data memory access, the access in area signal 130a is set, and the fetch in protected area register 124a is cleared. In some implementations, if the MPU 108 does not include a read-only access right, the logic circuit 128 can write protect against code corruption by generating the abort signal 120 if the data access signal 116 indicates a data memory access, the write access signal 119 indicates that the data memory access is a write data memory access, the access in area signal 130a is set, and the fetch in protected area register 124a is cleared. In some implementations, the OS is responsible for assuring that the protected memory areas do not overlap. In some implementations, constants generated by compilation of application code are protected by locating the generated constants in one or more of the protected memory areas.

After an abort signal 120 is generated and transmitted to the processor 102, the processor 102 aborts the data memory access to the protected area. In some implementations, the processor 102 performs secure operations to protect the data in the protected area. For example, the processor 102 can transmit a message to an administrator to inform the administrator that a prohibited attempt to access a protected area occurred. In another example, the processor 102 can force the microcontroller system 100 to run in a safe mode to prevent corruption or unauthorized copying of the protected data.

In some implementations, the MPU 108 is the only MPU in the microcontroller system 100, which can be implemented as a system-on-a-chip integrated circuit. In some implementations, the functions of the MPU described in this specification can be added to an existing MPU 108 of the microcontroller system 100. In other implementations, the MPU described in this specification can be implemented as an additional MPU external to the microcontroller system 100. For example, the additional MPU can be dedicated to an additional memory external to the microcontroller system 100, where both the external MPU and the external memory are coupled to the microcontroller system 100.

Secure Memory Access

Figure 2:
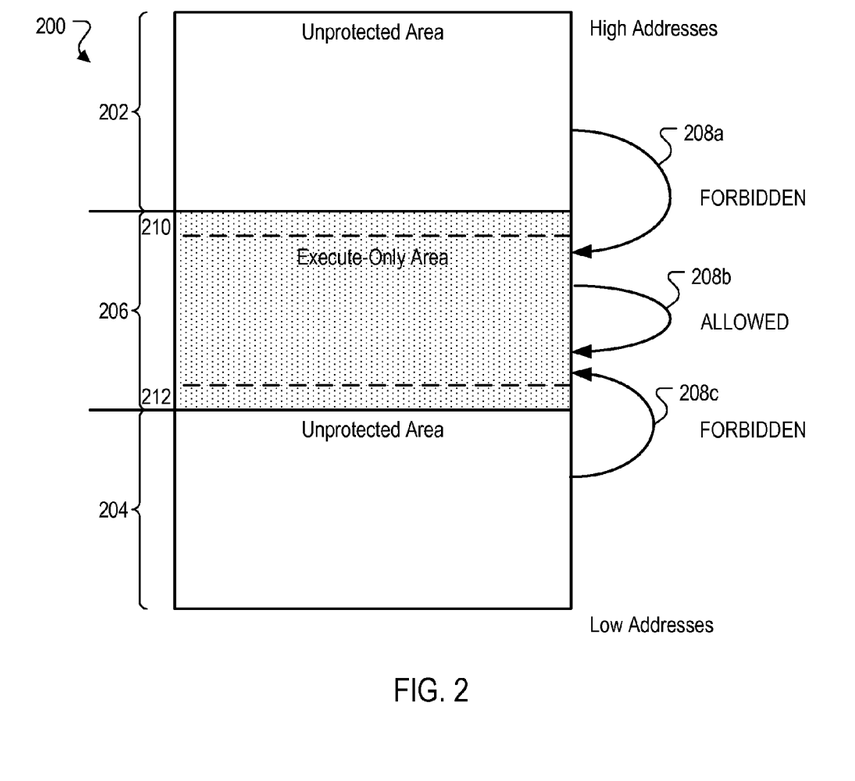
FIGS. 2-3 show example memory maps having an execute-only area.
Figure 3:
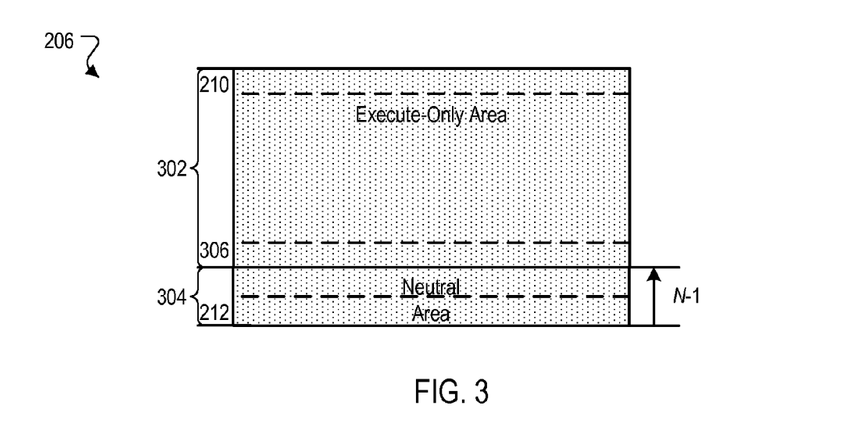

FIGS. 2-3 show example memory maps having an execute-only area. As shown in FIG. 2, a memory map 200 includes two unprotected areas 202, 204 and an execute-only area 206, which includes a protected area. For example, the memory map 200 with the execute-only area 206 can be generated to correspond to the memory 106 of FIG. 1. The memory map 200 can be generated by fixing or programming the execute-only area 206 in the address register pairs 122a-122k of the MPU 108 of FIG. 1. For example, an end memory address 210 and a start memory address 212 for the execute-only area can be programmed in the limit address register and the base address register, respectively, in one of the address register pairs 122a-122k.

Arrows 208a, 208b, 208c represent different types of data memory access from different parts of the memory map 200 to the execute-only area 206. In this example, the data memory accesses 208a and 208c originated from the unprotected area 202, 204, respectively. The data memory access 208b originated from the execute-only area 206. In one example, the data memory access 208a can be caused by an instruction fetched from the unprotected area 202 to read a memory location in the execute-only area 206. The data memory access 208b can be caused by an instruction fetched from the execute-only area 206 to read a memory location in the execute-only area 206. As shown in FIG. 2, the data memory accesses 208a, 208c are forbidden, while the data memory access 208b is allowed. In some implementations, if a forbidden data memory access 208a or 208c is detected, the processor 102 can receive an interrupt or abort signal (e.g., the abort signal 120 of FIG. 1) to prevent an instruction fetched from an unprotected area 202 or 204 from accessing data within the execute-only area 206.

In some implementations, the first N-1 addresses of the execute-only area 206 are forbidden from being read to prevent applications in the unprotected area 204 from reading the execute-only area 206 sequentially according to an N-stage instruction pipeline architecture of the processor 102. A processor 102 with N pipeline stages executes instructions in N stages. For example, a 3-stage instruction pipeline can have a first stage to fetch a first instruction (e.g., at address x), a second stage to decode the registers used in the first instruction, and a third stage to execute the first instruction. In this example, two additional instructions can be fetched before the first instruction is executed. That is, a second instruction (e.g., at address x+1) can be fetched while the first instruction is decoded (e.g., during the second stage), and a third instruction (e.g., at address x+2) can be fetched while the first instruction is executed (e.g., during the third stage). When the execute-only area 206 is entered sequentially according to the instruction pipeline, the first N-1 addresses of the execute-only area 206 are fetched before executing the last instruction of the unprotected area 204. To prevent a data memory access within the execute-only area 206 for the last instruction fetched from the unprotected area 204, when a fetch in protected area register for the execute-only area 206 would be set due to prefetching of the first N-1 instructions of the execute-only area 206, the first N-1 addresses of the execute-only area 206 are not protected to create a neutral area. That is, a data memory access to the first N-1 addresses of the execute-only area 206 is prohibited. The protected memory area that corresponds to the execute-only area 206 is the entire execute-only area 206 minus the first N-1 addresses of the execute-only area 206 (e.g., the neutral area). It is desirable that the first N-1 addresses of the execute-only area 206 contain insensitive instructions or No Operation (NOP) instructions.

Referring to FIG. 3, in some implementations the execute-only area 206, defined by the memory addresses 210, 212, includes two memory portions 302, 304. Memory portion 302 is the protected area, while memory portion 304 is the neutral area which is not protected. As shown, memory address 306 is the lowest address in the protected memory portion 302. The memory address 306 can be determined by adding N-1 to the start memory address 212.

In some implementations, the last N-1 addresses of the execute-only area 206 preferably contain neutral instructions, e.g., insensitive instructions or NOP instructions. When the execute-only area 206 is exited sequentially according to the instruction pipeline, the last instruction of the execute-only area 206 will be executed after the first two instructions from the unprotected area 202 have been fetched. The prefetching of these two instructions results in the fetch in protected area register for the execute-only area 206 being cleared when the last instruction of the execute-only area 206 is executed. If the last instruction of the execute-only area 206 is an instruction for a data memory access in the execute-only area, an abort would be generated because of the cleared fetch in protected area register. Accordingly, to prevent sensitive instructions from being aborted, sensitive instructions should not be included in the last N-1 addresses of the execute-only area 206.

Memory Access Process

Figure 4:
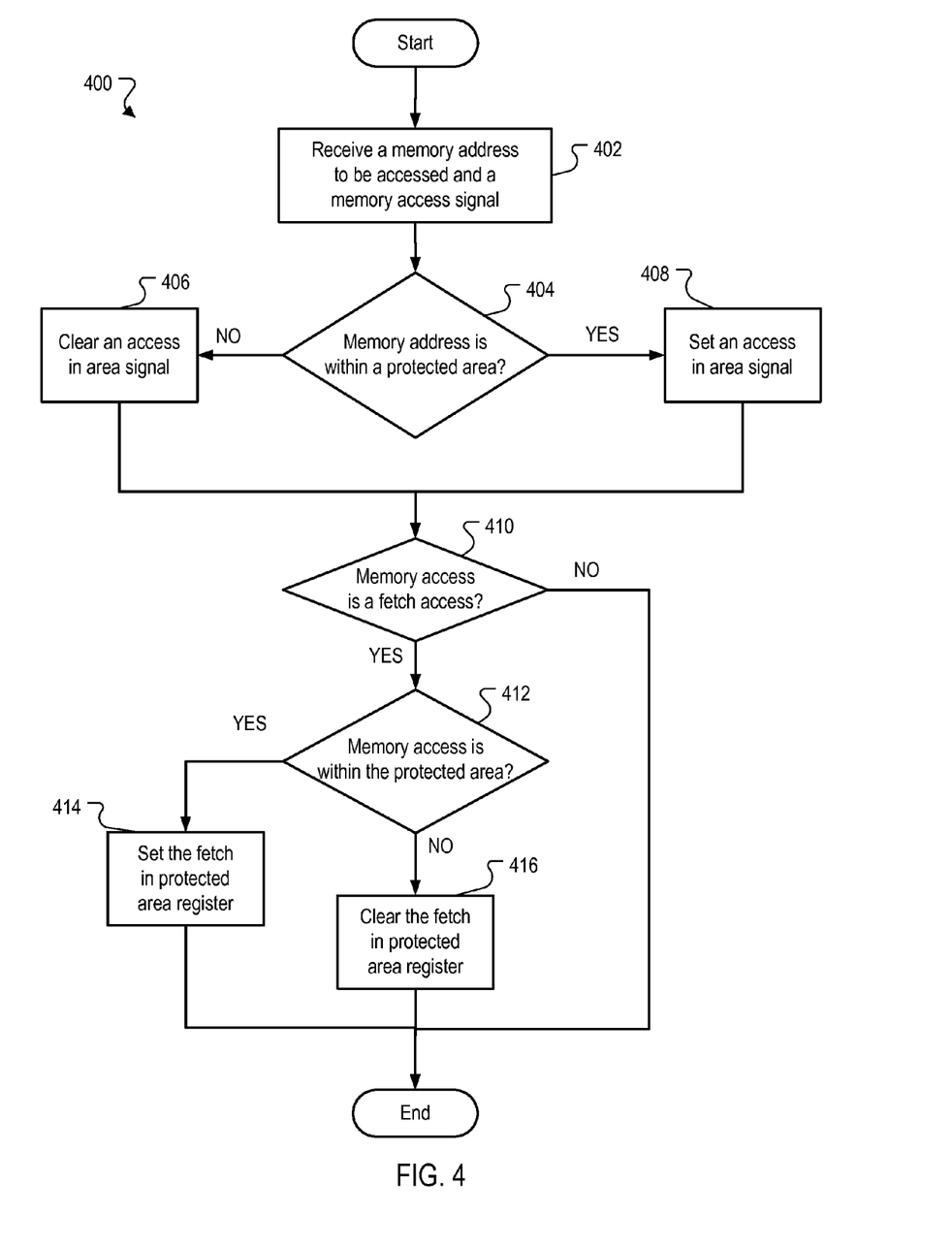
FIGS. 4-5 show example processes to provide execute-only access rights to one or more protected memory areas.
Figure 5:
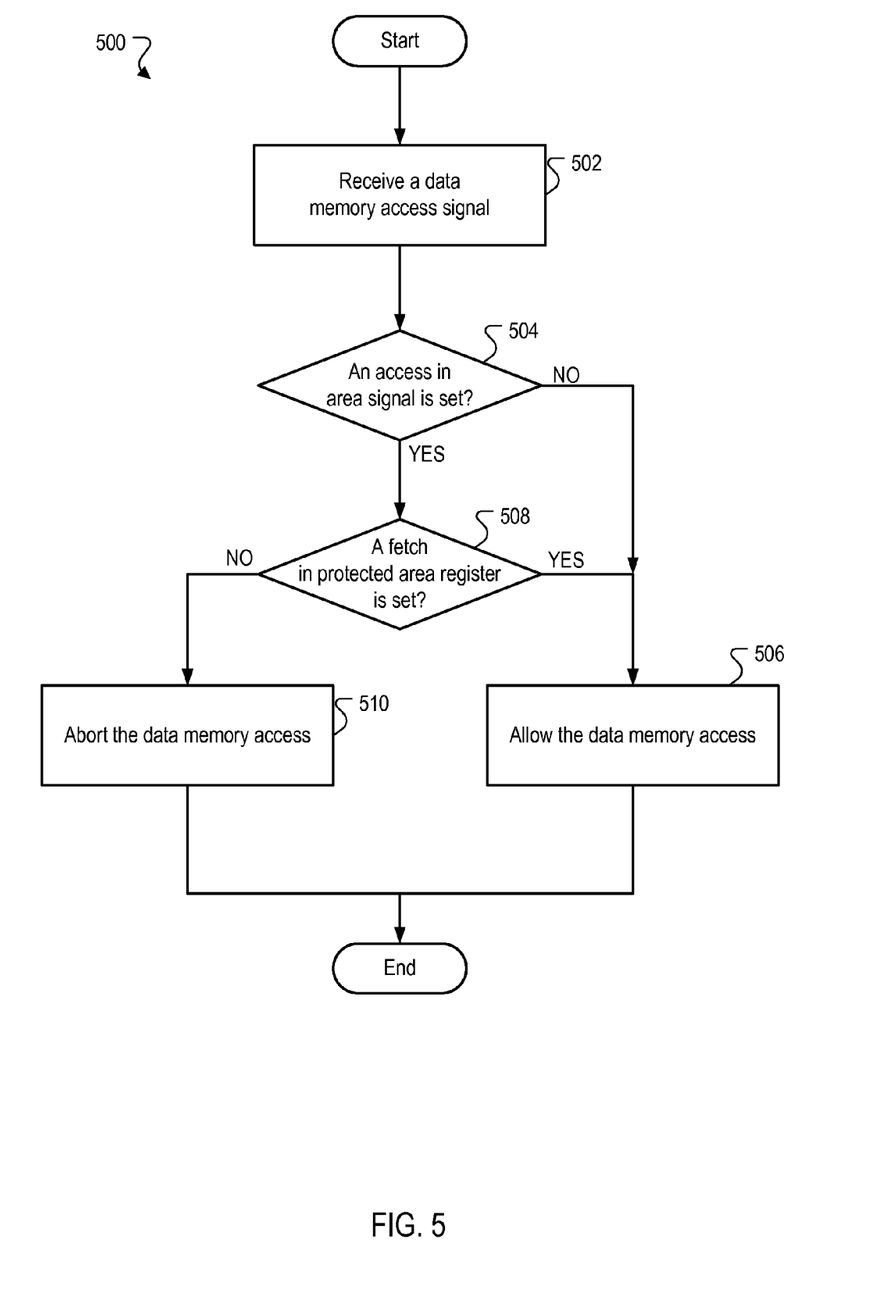

FIGS. 4-5 show example methods 400 and 500 to provide execute-only access rights to one or more protected memory areas. In some implementations, some or all the steps of the method 400 can be performed by one or more circuits (e.g., the logic circuit 126 in FIG. 1).

The method 400 begins by receiving a memory address to be accessed and one or more signals indicating a memory access, e.g., a memory access signal (step 402). For example, the logic circuit 126 can receive from the decoder 104 the fetch access signal 114 and a current memory address from the address bus 112.

The method 400 includes determining whether the memory address is within a protected area (decision 404). For example, the protected area can be part of a memory map and can be defined by a base address (e.g., a start address of an execute-only area), a limit address (e.g., an end address of the execute-only area), and a non-zero offset. In some implementations, the non-zero offset is equal to N-1, where N is the number of instruction pipeline stages of the processor in the microcontroller system. In some implementations, determining if the current memory address is within a protected area can include determining if the current memory address is within one of multiple protected areas of a memory map. In the example of the microcontroller system 100 of FIG. 1, the logic circuit 126 can compare the received memory address with the addresses stored in the address register pairs 122a-122k, where each address register pair defines one of multiple protected areas. For example, for a particular base and limit address register pair, the current memory address can be compared with the limit address and compared with the sum of the base address (e.g., the start address) and the non-zero offset. In other implementations, the base address register can store the sum of the start address and the non-zero offset. The current memory address can then be compared with the limit address and compared with the base address, directly.

In some implementations, the logic circuit 126 performs one subtraction and one comparison to determine whether the memory address is in the protected area. First, the logic circuit 126 subtracts the received memory address with the sum of the non-zero offset and the address stored in the base address register (e.g., the start address). If the difference is less than zero, then the logic circuit 126 determines that the memory address is not in the protected area. If the difference is greater than or equal to zero, then the memory address is compared to the limit address (e.g., the end address) stored in the limit address register. If the memory address is greater than the limit address, then the logic circuit 126 determines that the memory address is not in the protected area. If the memory address is less than or equal to the limit address, the logic circuit 126 determines that the memory address is in the protected area.

If the memory address is not within a protected area ("no" branch of decision 404), then the method 400 includes clearing an access in area signal for the protected area (e.g., one of the access in area signals 130a-130k of FIG. 1) (step 406). In some implementations, for each protected area that does not include the memory address, the corresponding access in area signal is cleared. For example, the logic circuit 126 can set the access in area signal to a logic state 0. If the memory address is within a protected area ("yes" branch of decision 404), then the method 400 includes setting the access in area signal for the protected area (step 408). For example, the logic circuit 126 can set the access in area signal to a logic state 1. In some implementations, the access in area signal is an access flag.

The method 400 includes determining whether the memory access is a fetch access (decision 410). For example, the logic circuit 126 can check whether the fetch access signal 114 is set to logic 1, meaning the memory access is a fetch memory access. In some implementations, if the processor 102 is an ARM7TDMI processor, then the decoder 104 can determine the fetch access signal 114 based on an nOPC signal from the processor 102. For example, if nOPC equals logic 0, the decoder 104 can set the fetch access signal 114 to logic 1, meaning the memory access is a fetch memory access.

If the memory access is not a fetch access ("no" branch of decision 410), the method 400 ends. If the memory access is a fetch access ("yes" branch of decision 410), the method 400 includes determining whether the memory access is within a protected area (decision 412). For example, the logic circuit 126 can determine whether the memory access is within any of multiple protected areas using the same method as described in step 404. Alternatively, the logic circuit 126 can check the value of the access in area signals.

If the memory access is within a protected area ("yes" branch of decision 412), the method 400 includes setting a fetch in protected area register for the protected area (step 414), and the method 400 ends. For example, the logic circuit 126 can set the fetch in protected area register 124k of FIG. 1 to logic 1 if the memory access is within the protected area corresponding to the address register pair 122k as a fetch memory access.

If the memory access is not within a particular protected area ("no" branch of decision 412), the method 400 includes clearing the fetch in protected area register for the particular protected area (step 416), and the method 400 ends. For example, the logic circuit 126 can set the fetch in protected area register 124a of FIG. 1 to logic 0 if the memory access is not within the protected area corresponding to the address register pair 122a as a fetch memory access. In some implementations, the value in the fetch in protected area register is a protected fetch flag.

In some implementations, some or all the steps of the method 500 of FIG. 5 can be performed by one or more circuits (e.g., the logic circuit 128 in FIG. 1). In some implementations, the method 500 uses the results of the method 400 to determine whether a memory access is allowed.

The method 500 begins by receiving a data memory access signal for a data memory access in a memory area (step 502). In some implementations, one or more received signals are determined as indicating a data memory access, e.g., a read data memory access or a write data memory access. For example, in an ARM7TDMI processor, a read data access signal is a combination of control signals: nRW=0, nOPC=1, and nMREQ=0. In some implementations, the decoder 104 receives the control signals 110 and provides the data access signal 116 and the read access signal 118 to the logic circuit 128. In some implementations, the decoder 104 also provides a write access signal 119 to the logic circuit 128.

The method 500 determines whether an access in area signal is set for a protected area (decision 504). For example, the logic circuit 128 receives the access in area signals 130a-130k from the logic circuit 126 that is performing the method 400. If none of the access in area signals 130a-130k is set (e.g., they were cleared by logic circuit 126) ("no" branch of decision 504), the method 500 includes allowing the data memory access (step 506), and the method 500 ends. For example, the logic circuit 128 can clear the abort signal 120.

If one of the access in area signals 130a-130k is set ("yes" branch of decision 504), the method 500 includes determining whether the corresponding fetch in protected area register is set (decision 508). For example, the logic circuit 128 can check the value stored in the corresponding fetch in protected area register. If the corresponding fetch in protected area register is set ("yes" branch of decision 508), the method 500 allows the data memory access (step 506). If the corresponding fetch in protected area register is not set (e.g., cleared by logic circuit 126) ("no" branch of decision 508), the method 500 includes aborting the data memory access (step 510). For example, the logic circuit 128 can transmit a set abort signal 120 to the processor 102 to abort or interrupt the data memory access (e.g., a read data memory access or a write data memory access). In some implementations, aborting the data memory access includes setting an abort flag to abort the data memory access.

The subject matter and all of the functional operations described in this specification can be implemented in digital electronic circuitry, or in computer hardware, firmware, software, or in combinations of them. Apparatus of the subject matter described in this specification can be implemented in a computer program product tangibly embodied in a machine-readable storage device for execution by a programmable processor; and method steps of the subject matter described in this specification can be performed by a programmable processor executing a program of instructions to perform functions of the subject matter by operating on input data and generating output.

The subject matter described in this specification can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; a magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the subject matter described in this specification can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of embodiments have been described in this specification. Nevertheless, it will be understood that various modifications may be made without departing from the spirit and scope of the subject matter described in this specification. Accordingly, other embodiments are within the scope of the following claims.

What is claimed is:

1. A method comprising:
   receiving one or more signals indicating a memory access;
   reading a current address;
   determining that the current address is within a protected area of a memory map, the protected area defined by a base address, a limit address, and a non-zero offset;
   in response to determining that the current address is within the protected area of the memory map, setting an access flag;
   determining that the one or more signals indicate a fetch memory access and that the fetch memory access is not within the protected area of the memory;
   in response to determining that the one or more signals indicate a fetch memory access and that the fetch memory access is not within the protected area of the memory, clearing a protected fetch flag;
   determining that the one or more signals indicate a data memory access, that the access flag is set, and that the protected fetch flag is cleared; and
   in response to determining that the one or more signals indicate a data memory access, that the access flag is set, and that the protected fetch flag is cleared, aborting the data memory access.

2. The method of claim 1, further comprising:
   receiving one or more different signals indicating a memory access;
   determining that the one or more different signals indicate a data memory access;
   determining that the access flag is cleared or that the protected fetch flag is set; and
   in response to determining that the access flag is cleared or that the protected fetch flag is set, allowing the data memory access.

3. The method of claim 1, wherein determining that the current address is within a protected area of the memory map further comprises:

determining that the current address is greater than or equal to the sum of the base address and the non-zero offset and that the current address is less than or equal to the limit address.

4. The method of claim 1, wherein aborting the data memory access further comprises:

setting an abort flag to abort the data memory access.

5. The method of claim 1, wherein determining that the one or more signals indicate a data memory access further comprises:

determining that the one or more signals indicate a read data memory access.

6. The method of claim 1, wherein determining that the one or more signals indicate a data memory access further comprises:

determining that the one or more signals indicate a write data memory access.

7. The method of claim 1, wherein the base address and limit address are fixed.

8. The method of claim 1, wherein the base address and the limit address are programmable.

9. The method of claim 1, wherein:

the memory map corresponds to a memory array coupled to a processor; and the non-zero offset is equal to a number of instruction pipeline stages of the processor minus one.

10. The method of claim 9, wherein the processor has a Von Neumann architecture.

11. The method of claim 1, wherein determining that the current address is within a protected area of a memory map further comprises:

determining that the current address is within one of a plurality of protected areas of the memory map, each protected area defined by a respective base address, a respective limit address, and the non-zero offset.

* * * * *